United States Patent
Pope et al.

(10) Patent No.: US 12,397,718 B2
(45) Date of Patent: Aug. 26, 2025

(54) LOW PROFILE CROSSBAR MOUNTING PLATE ASSEMBLY FOR A VEHICLE BODY

(71) Applicant: Minth North America, Inc., Wixom, MI (US)

(72) Inventors: Darin Pope, Howell, MI (US); Arunchunaikani Thalaimuthu, Lake Orion, MI (US)

(73) Assignee: Minth North America, Inc.

( * ) Notice: Subject to any disclaimer, the term of this patent is extended or adjusted under 35 U.S.C. 154(b) by 72 days.

(21) Appl. No.: 18/594,303

(22) Filed: Mar. 4, 2024

(65) Prior Publication Data

US 2024/0308433 A1  Sep. 19, 2024

Related U.S. Application Data

(60) Provisional application No. 63/451,696, filed on Mar. 13, 2023.

(51) Int. Cl.
| | | |
|---|---|---|
| B60R 9/052 | (2006.01) | |
| B60R 9/04 | (2006.01) | |
| B60R 9/058 | (2006.01) | |

(52) U.S. Cl.
CPC ............. B60R 9/052 (2013.01); B60R 9/04 (2013.01); B60R 9/058 (2013.01)

(58) Field of Classification Search
CPC ............ B60R 9/052; B60R 9/04; B60R 9/058
See application file for complete search history.

(56) References Cited

U.S. PATENT DOCUMENTS

| | | | | |
|---|---|---|---|---|
| 3,902,641 | A * | 9/1975 | Peasley | B60R 9/058 224/322 |
| 5,782,392 | A * | 7/1998 | Yamamoto | B60R 9/04 224/325 |
| 5,975,391 | A * | 11/1999 | Aftanas | B60R 9/04 224/326 |
| 10,040,403 | B2 * | 8/2018 | McFadden | B60R 9/058 |
| 10,071,692 | B2 * | 9/2018 | Kmita | B60R 9/05 |
| 10,150,423 | B2 * | 12/2018 | Sautter | B60R 9/055 |
| 10,611,311 | B1 * | 4/2020 | Chervu | B60R 9/052 |
| 11,027,660 | B2 * | 6/2021 | Gomes | B60R 9/045 |

(Continued)

FOREIGN PATENT DOCUMENTS

| | | |
|---|---|---|
| DE | 102019209289 B4 | 4/2022 |
| DE | 102021117122 B3 | 1/2023 |

(Continued)

*Primary Examiner* — Khaled Annis
(74) *Attorney, Agent, or Firm* — Dickinson Wright PLLC (57) ABSTRACT

A vehicle body includes a first and second header extending in spaced and generally parallel relationship with one another. A glass roof extends between a first glass side disposed adjacent the first header and a second glass side disposed adjacent the second header. The glass roof defines at least one first glass cut-out extending inwardly from the first glass side and at least one second glass cut-out extending inwardly from the second glass side and disposed in aligned relationship with the at least one first glass cut-out. A plurality of low profile crossbar mounting plate (LPCMP) assemblies are each secured to a respective one of the first or second headers and extend into a respective one of the first or second glass cut-outs for use in releasably securing a crossbar to the vehicle body.

20 Claims, 10 Drawing Sheets

(56) References Cited

U.S. PATENT DOCUMENTS

| | | | |
|---|---|---|---|
| 11,260,801 B2* | 3/2022 | Chervu | B60R 13/04 |
| 11,279,295 B2* | 3/2022 | Gauci | B60R 9/058 |
| 11,305,701 B2* | 4/2022 | Mansour | B60R 9/052 |
| 11,619,254 B2* | 4/2023 | Michaels | F16B 37/061 |
| | | | 296/210 |
| 11,828,066 B2* | 11/2023 | Nill | F16B 9/02 |
| 11,884,243 B2* | 1/2024 | Menegazzo | B60R 9/045 |
| 12,036,954 B2* | 7/2024 | Badillo | B60R 9/058 |
| 12,291,099 B2* | 5/2025 | Inoue | B60R 11/0235 |
| 2008/0083800 A1* | 4/2008 | Mathew | B60R 9/058 |
| | | | 224/322 |
| 2009/0145941 A1* | 6/2009 | Kiyota | B60R 9/04 |
| | | | 224/326 |
| 2009/0152903 A1* | 6/2009 | Fuchs | B60R 9/058 |
| | | | 296/210 |
| 2015/0180178 A1* | 6/2015 | Ranka | H01R 13/74 |
| | | | 403/299 |
| 2019/0256007 A1* | 8/2019 | Mansour | B60R 9/058 |
| 2020/0139901 A1* | 5/2020 | Kowal | B60R 13/04 |
| 2020/0231095 A1* | 7/2020 | Chervu | B60R 9/052 |
| 2022/0340086 A1* | 10/2022 | Christensen | B60R 9/048 |
| 2023/0027504 A1* | 1/2023 | Martinez | B60R 9/058 |
| 2023/0108570 A1* | 4/2023 | Barberis | B60R 9/058 |
| | | | 224/321 |
| 2023/0150437 A1* | 5/2023 | Bernal | B62D 25/06 |
| | | | 296/37.7 |
| 2024/0034243 A1* | 2/2024 | Yao | B60R 9/08 |
| 2024/0253572 A1* | 8/2024 | Sato | B60R 9/04 |
| 2024/0308433 A1* | 9/2024 | Pope | B60R 9/052 |

FOREIGN PATENT DOCUMENTS

| | | | |
|---|---|---|---|
| EP | 1584516 A1 | 10/2005 | |
| WO | WO-2024191780 A1 * | 9/2024 | B60R 9/058 |

* cited by examiner

LOW PROFILE CROSSBAR MOUNTING PLATE ASSEMBLY FOR A VEHICLE BODY

CROSS-REFERENCE TO RELATED APPLICATION

This application claims the benefit of U.S. Provisional Patent Application Ser. No. 63/451,696 filed on Mar. 13, 2023, the entire disclosure of which is incorporated herein by reference.

BACKGROUND OF THE INVENTION

1. Field of the Invention

The present invention relates to a crossbar for a vehicle. More particularly, the present invention relates to a means for mounting a crossbar to a vehicle, preferably one having a glass roof.

2. Related Art

This section provides background information related to the present disclosure which is not necessarily prior art.

Figure 1:
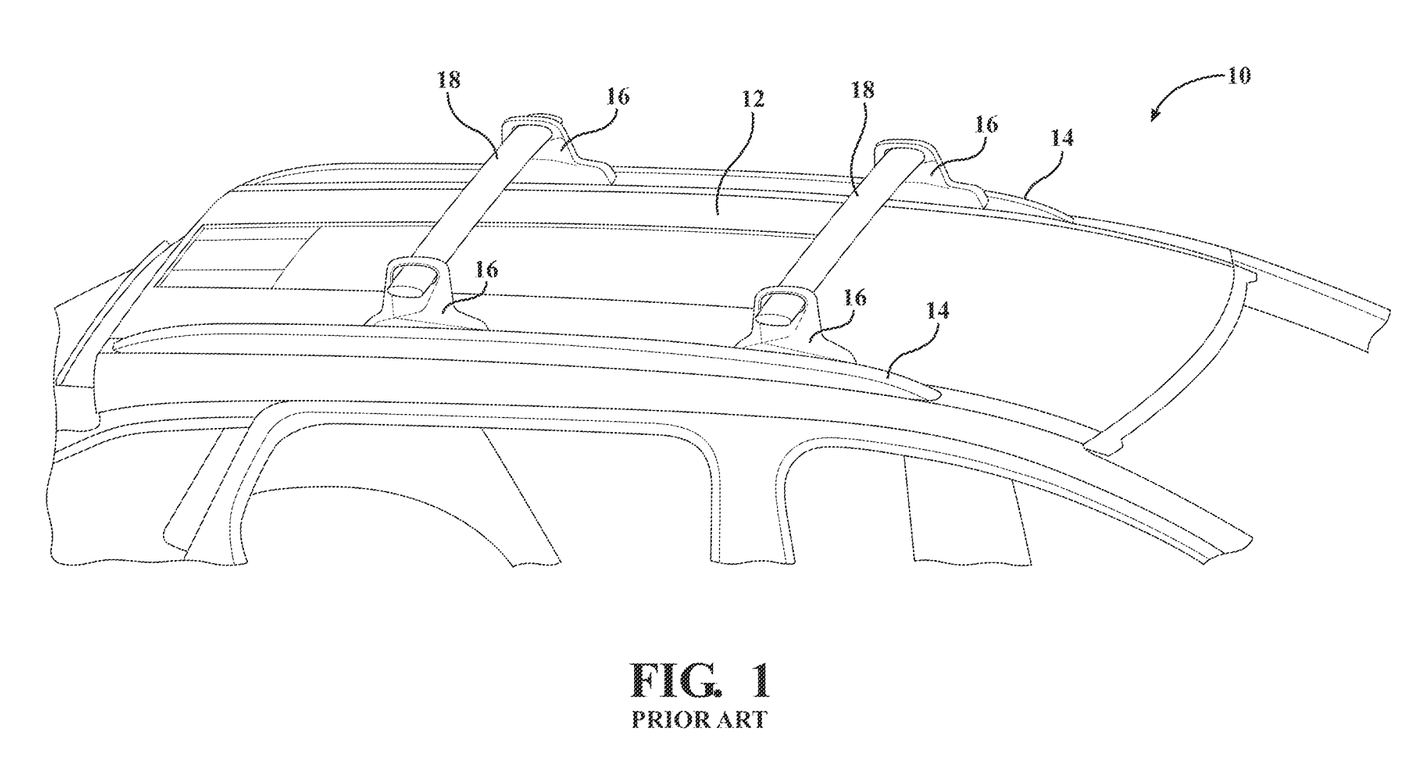
FIG. 1 is a perspective view of a prior art system for securing a crossbar to a vehicle with a metal roof.
Figure 2A:
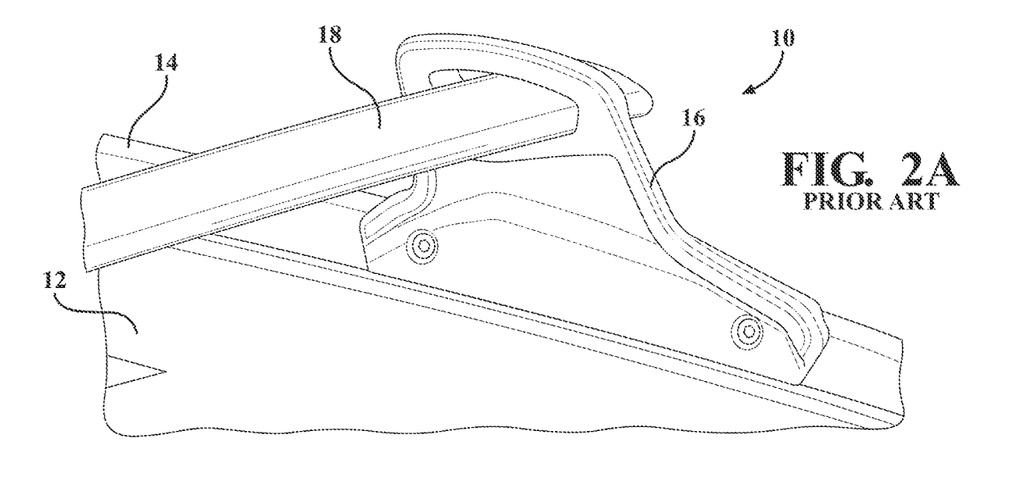
FIGS. 2A and 2B are magnified views of portions of FIG. 1 more clearly illustrating a side rail attached to the metal roof for receiving a support and a crossbar in the prior art system.
Figure 2B:
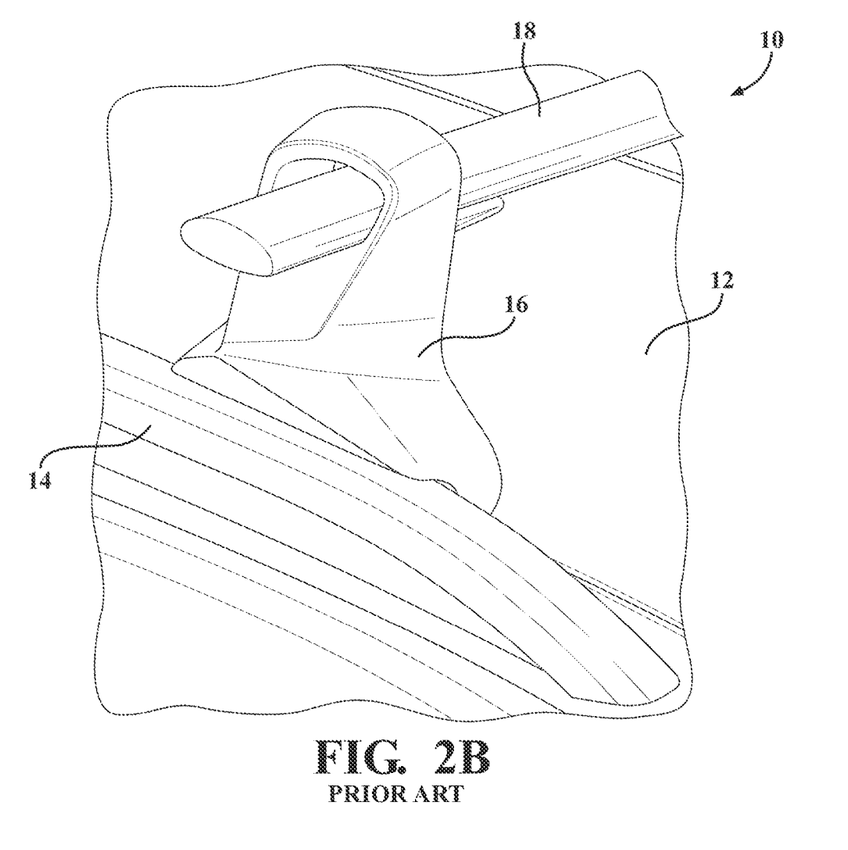

Crossbars commonly extend traversely above a roof of a vehicle for allowing a driver to secure and transport cargo on the crossbars and along a top of the vehicle. For example, as illustrated in FIGS. 1-2B, a vehicle body 10 having a metal roof 12 can include a pair of side rails 14 extending along and upwardly from opposite sides of the metal roof 12. A pair of supports 16 are attached to a respective one of the side rails 14 (such as to an inner surface of the upwardly extending side rails 14, as shown in FIGS. 2A-2B). A crossbar 18 extends between the pair of supports 16 to secure the crossbar 18 to the metal roof 12 of the vehicle body 10. However, the crossbars 18 extend far above the metal roof 12, by way of the supports 16, and thus can be unaesthetic to the driver of the vehicle.

Figure 3A:
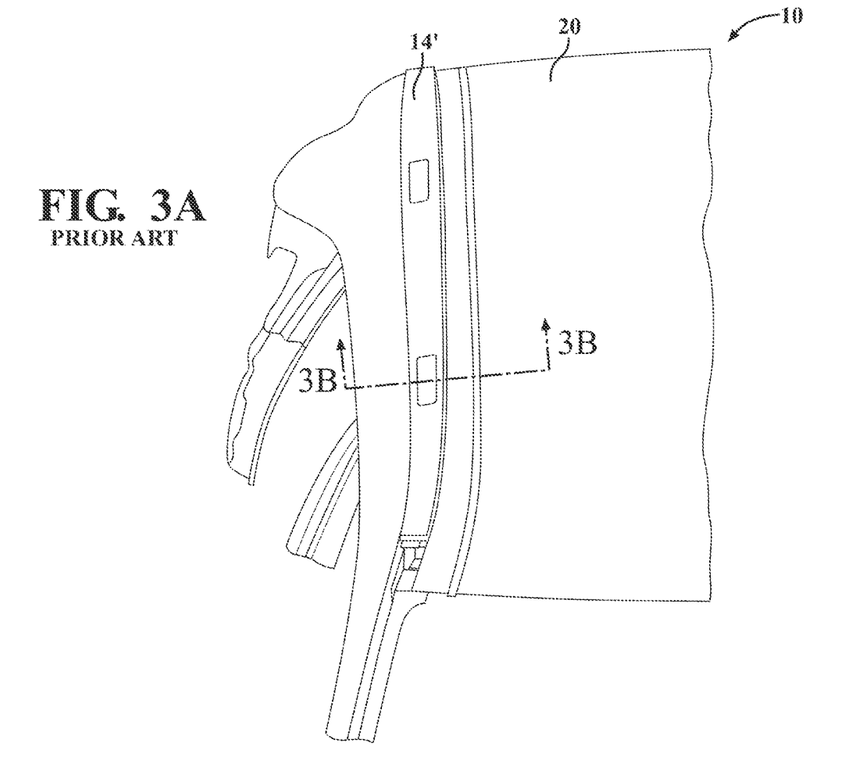
FIGS. 3A and 3B are respective perspective and cross-sectional views of a prior art system for securing a crossbar to a vehicle body with a glass roof using a roof/side rail which extends upwardly from and is disposed above the glass roof and a plastic trim component extending between the glass roof and the roof/side rail.
Figure 3B:
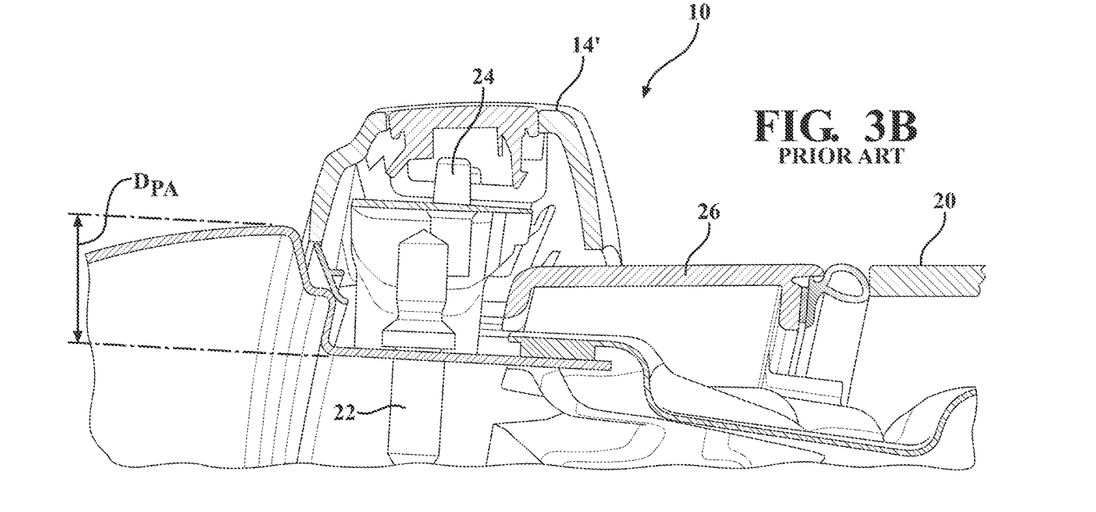

As illustrated in FIG. 3, with the emergence of electric vehicles as well as advanced vehicle designs, the vehicle body 10 can be equipped with a glass roof 20 instead of the metal roof 12 to improve a driving experience for the driver, and any passengers in the vehicle. In this case, the vehicle body 10 still includes a pair of side/roof rails 14' extending along and upwardly from the vehicle body 10 adjacent to and along opposite sides of the glass roof 20. As best illustrated in the cross-sectional view of FIG. 3, in an example arrangement, the side rails 14' are attached to the vehicle body via body mounting screws 22 and house separate internal threads 24 for receiving a fastener (not expressly shown) for removably securing the cross bar to the side rails 14. While seeking to reduce a profile of the side rails 14 relative to the prior art designs used with the metal roof, this design still requires a significant roof ditch, such as having a prior art roof ditch depth $D_{PA}$ of approximately 22 mm, to accommodate the minimum thread engagement requirements for the body mounting screws 22 and the crossbar fasteners. Accordingly, as shown in the cross-sectional view of FIG. 3, the side rails 14' still must extend above the glass roof 20. Thus, the vehicle body 10 still includes a roof/side rail 14 component which extends above the glass roof 20 and is visually perceived by a driver of the vehicle, even when a crossbar 18 is not attached to the vehicle body 10. Additionally, a plastic trim or molding component 26 must be present between the side rails 14' and the glass roof 20 to avoid the potential for glass cracking.

Accordingly, there remains a continuing need for an improved means of attaching a crossbar to a roof of a vehicle, particularly one with a glass roof, having a lower profile design and reduced components and related cost.

SUMMARY OF THE INVENTION

The subject disclosure is directed to a vehicle body including a low profile crossbar mounting plate (LPCMP) assembly directly secured to a header of the vehicle body and extending inwardly into a cut-out defined by an adjacent side of a glass roof. The low profile crossbar mounting plate assembly removably receives crossbar supports for use in securing a crossbar to the vehicle body. Yet, when the crossbar is not required and removed from the vehicle, the low profile crossbar mounting plate assembly is not visible to a driver of the vehicle, namely because the roof rails are eliminated and do not extend upwardly from the vehicle body and above the glass roof. Accordingly, the low profile crossbar mounting plate assembly provides a low profile design in furtherance of the design aesthetics sought by electric vehicles and advanced vehicle designs. As will be described in more detail below, the low profile crossbar mounting plate assembly also eliminates the requirement of the plastic molding component, and can avoid the potential for cracking of the glass roof with fewer components relative to the prior art designs.

BRIEF DESCRIPTION OF THE DRAWINGS

These and other advantages of the present disclosure will be more readily understood by reference to the following description in combination with the accompanying drawings wherein.

DETAILED DESCRIPTION OF THE ENABLING EMBODIMENTS

Example embodiments will now be described more fully with reference to the accompanying drawings. In general, the subject embodiments are directed to a low profile crossbar mounting plate (LPCMP) assembly 50 for securing a crossbar 18' to a vehicle body 30 having a glass roof 40. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms (such as implementing the LPCMP assembly 50 with a vehicle body having a metal roof) and that neither should be construed to limit the scope of the disclosure. In some example embodiments, well-known processes, well-known device structures, and well-known technologies are not described in detail.

Figure 4:
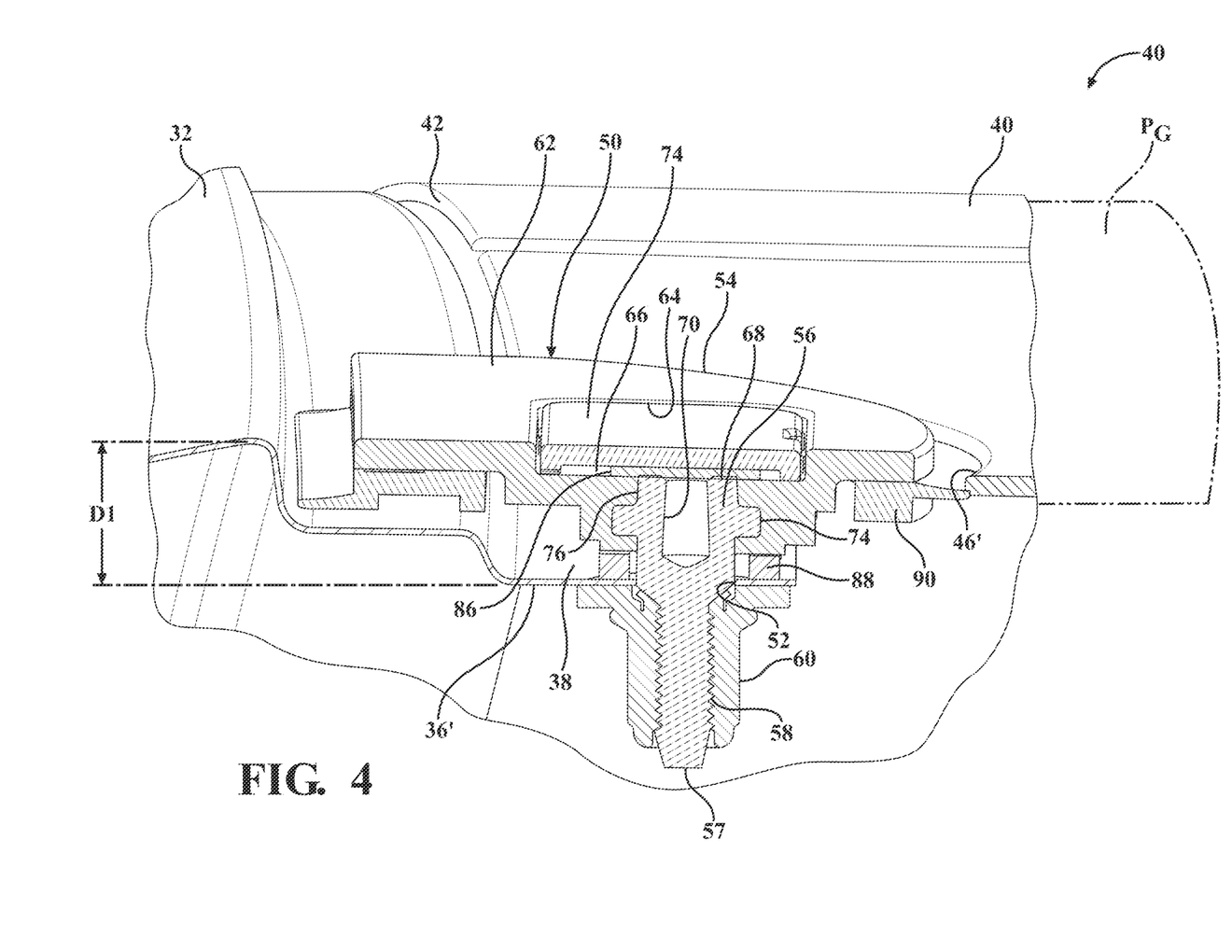
FIG. 4 is a magnified perspective and cross-sectional view of a low profile crossbar mounting plate (LPCMP) assembly secured to a header of the vehicle body and extending into a glass cut-out of a glass roof and shown with the support and crossbar removed to illustrate the low profile design for the LPCMP assembly.
Figure 5:
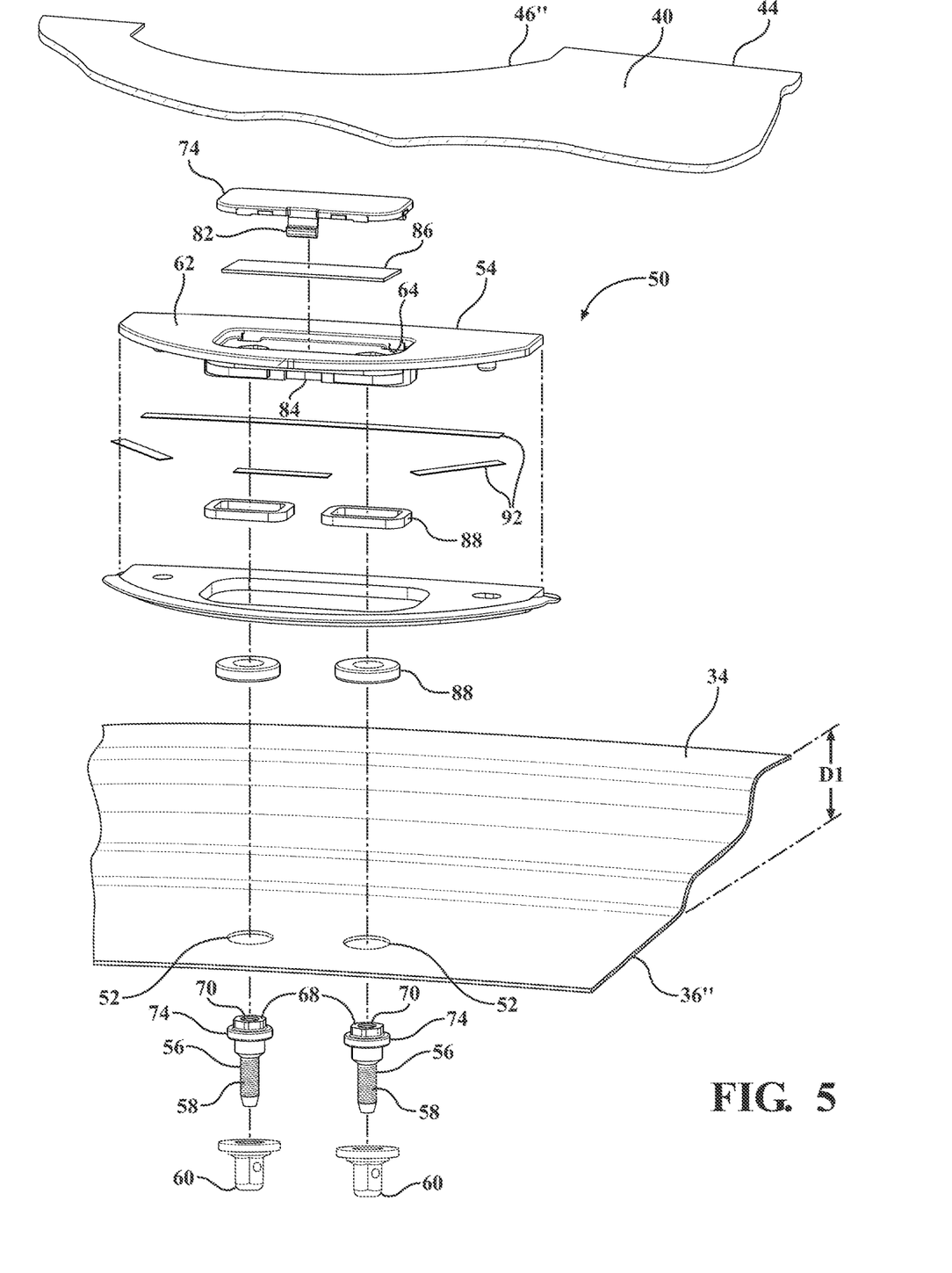
FIG. 5 is an exploded perspective view of the LPCMP assembly relative to the glass roof and a roof flange of the header of the vehicle body.

As best illustrated in FIGS. 4-10B, a vehicle body 30 in accordance with the subject disclosure includes a first header 32 and a second header 34 extending in spaced and generally parallel relationship with one another from adjacent a front of the vehicle body 30 to adjacent a rear of the vehicle body 30. Each of the first and second header 32, 34 include respective first and second roof flanges 36', 36" which extend inwardly towards the opposing first or second header 32, 34 to define a roof ditch 38. As best illustrated in FIGS. 4-5, the roof ditch 38 has a roof ditch depth Di defined between a lower surface of the respective roof flange 36 and an upper surface of the respective first or second header 32, 34. A glass roof 40 extends between the first and second headers 32, 34 along a slightly arcuate glass plane $P_G$ from a first glass side 42 which extends adjacent the first header 32 and rests along the first roof flange 36' of the first header 32 to a second glass side 44 which extends adjacent the second header 34 and rests along the second roof flange 36" of the second header 34 to dispose the glass roof 40 within the roof ditch 38.

Figure 10A:
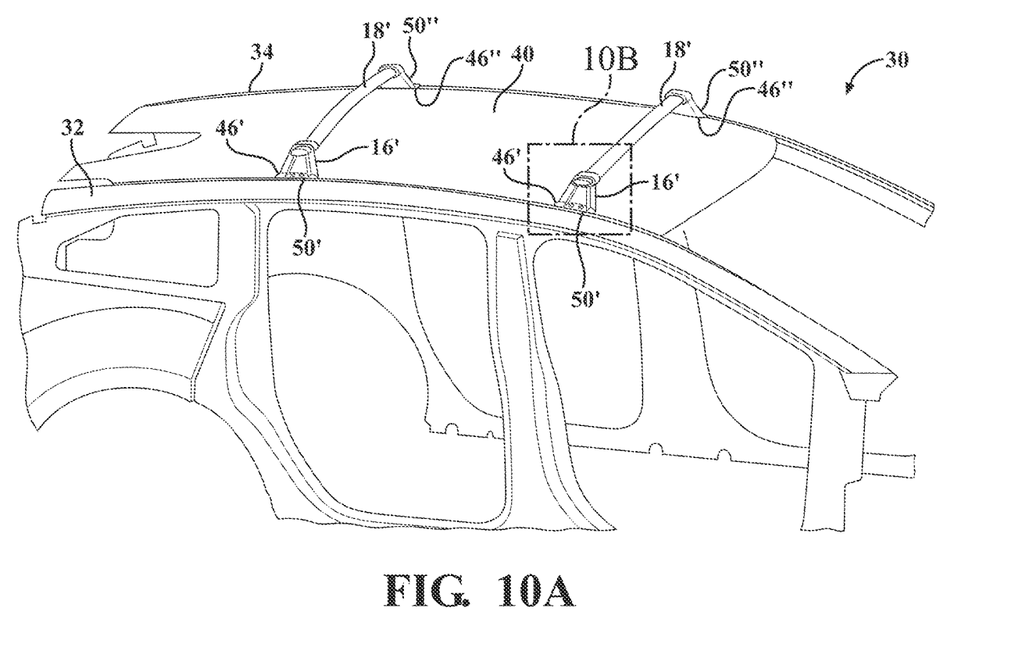
FIG. 10A is a perspective view of the vehicle body illustrating a first and second header extending in parallel and spaced relationship with one another, the glass roof defining a pair of first glass cutouts disposed along a first glass side adjacent the first header and a pair of second glass cutout disposed along a second glass side adjacent the second header, a plurality of LPCMP assemblies each connected to a respective first or second header of the vehicle body and extending into respective ones of the first or second glass cutouts, and the crossbar supports being connected to respective ones the LPCMP assemblies for securing the crossbar to the vehicle body having the glass roof.
Figure 10B:
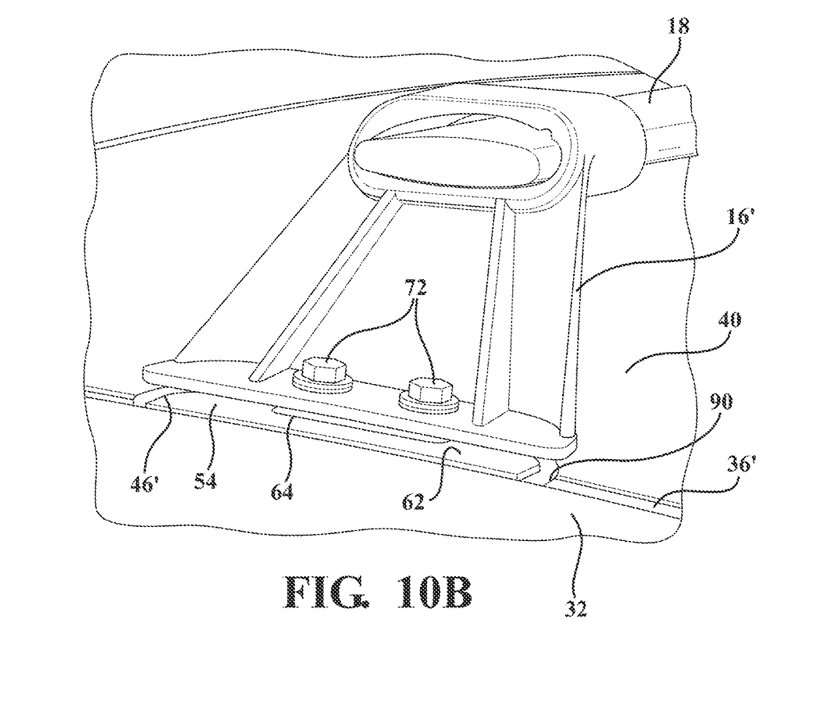
FIG. 10B is a magnified view of a portion of FIG. 10A more clearly illustrating the crossbar support secured to a respective LPCMP assembly.

The glass roof 40 defines at least one and preferably a plurality of first glass cut-outs 46' which are disposed in spaced relationship with one another along the first glass side 42 and at least one and preferably a plurality of second glass cut-outs 46" which are disposed in spaced relationship with one another along the second glass side 44 and aligned with the plurality of first glass cut-outs 46' on the opposing first glass side 42. For example, as best illustrated in FIG. 10A, in a preferred arrangement the plurality of first and second glass cut-outs 46', 46" include a first pair of glass cut-outs 46' disposed adjacent the first header 32 and along the first glass side 42 and a second pair of glass cut-outs 46" disposed adjacent the second header 34 and along the second glass side 44. In the preferred arrangement, the plurality of glass cut-outs 46', 46" are semi-circular in shape, but different shapes could be utilized without departing from the scope of the subject disclosure.

As illustrated in FIGS. 4-11, a plurality of low profile crossbar mounting plate (LPCMP) assemblies 50 are each secured to the first or second roof flange 36 of the first or second headers 32, 34 and extend along the glass plane $P_G$ and into a respective one of the plurality of glass cut-outs 46', 46". As best illustrated in FIG. 10A, in a preferred arrangement, the plurality of LPCMP assemblies 50 include a first pair of LPCMP assemblies 50' secured to the first roof flange 36' of the first header 32 and each extending into a respective one of the pair of first glass cut-outs 46' and a second pair of LPCMP assemblies 50" secured to the second roof flange 36" of the second header 34 and each extending into a respective one of the pair of second glass cut-outs 46". The combination of the LPCMP assemblies 50 and the glass cut-outs 46 ultimately accommodate attachment of a pair of crossbars 18' to the vehicle body 30 using a lower profile implementation relative to the prior art designs (See FIG. 10A), namely because the side rails are eliminated and the LPCMP assemblies 50 can be secured directly to the vehicle body 30, as will be appreciated in view of the following more detailed disclosure.

As best illustrated in FIGS. 4-5, 8 and 11, the first and second roof flanges 36', 36" of the first and headers 32, 34 each define at least one aperture 52 disposed adjacent each one of the plurality of glass cut-outs 46, and to which a respective one of the plurality of LPCMP assemblies 50 is secured. More specifically, the first and second roof flanges 36', 36" preferably include a pair of apertures 52 disposed adjacent each one of the plurality of glass cut-outs 46. Each LPCMP assembly 50 includes a mounting plate 54 which extends from adjacent the first or second header 32, 24 and along the glass plane $P_G$ into the respective glass cut-out 46. The LPCMP assembly 50 is secured to the respective first or second roof flange 36', 36" via at least one integrated fastener 56 (and in the preferred embodiment a pair of integrated fasteners 56) which are over-molded into the mounting plate 54 and each placed into a respective one of the apertures 52. In other words, the LPCMP assembly 30 is mounted to the vehicle body 30 by mating the integrated fasteners 56 of the mounting plate 54 with respective apertures 52 defined by the roof flange 36 in the roof ditch 38. As further illustrated in FIGS. 4-5 and 8, a bottom end 57 of the integrated fasteners 56 which extend through the apertures 52 can define an external thread 58 and a nut 60 is threaded onto the external thread 58 of the integrated fasteners 36 and tightened against a lower surface of the first or second roof flange 36', 36" to secure each LPCMP assembly 50 to the first or second header 32, 34. The mounting plate 54 preferably has a semi-circular shape to match a profile of the glass cut-outs 46 into which the mounting plate 54 extends, but could be shaped differently (e.g., square, rectangular, or the like) depending on a corresponding (and different shape) of the glass cut-outs 46. This corresponding shape allows the mounting plate 54 to nest within the glass roof 40 in furtherance of reducing the profile for the LPCMP assembly 30. The mounting plate 54 is also preferably comprised of an aluminum alloy, a magnesium alloy, plastic, sheet metal, or the like.

Figure 9:
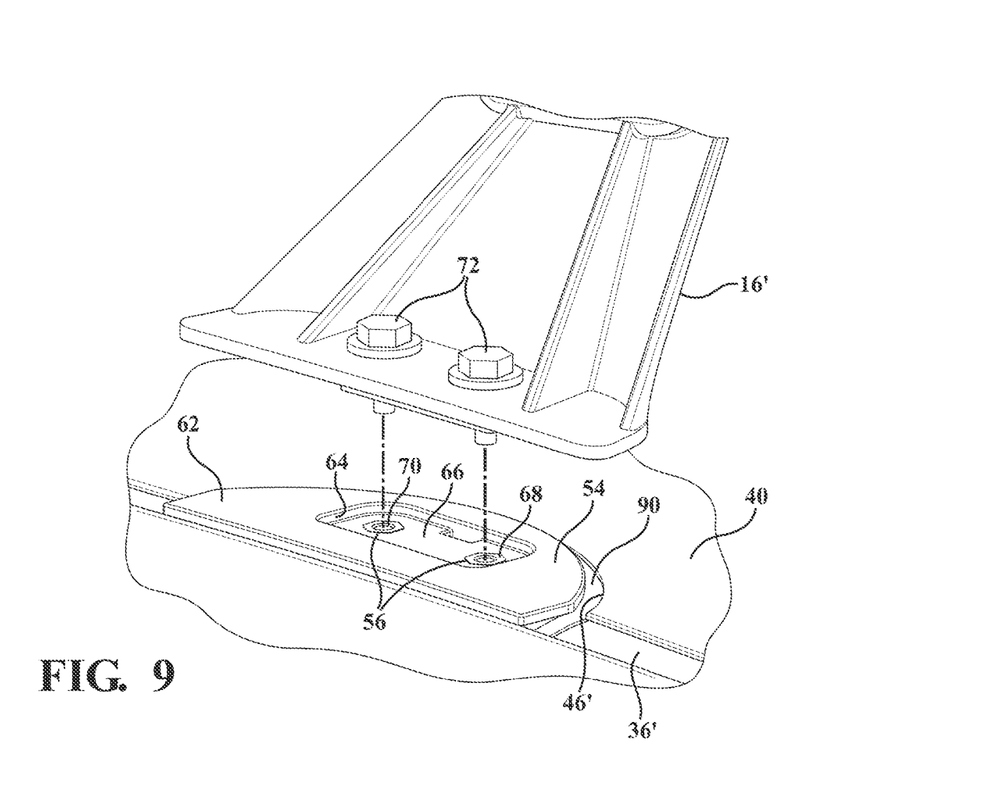
FIG. 9 is a perspective view of the LPCMP assembly illustrating support fasteners of the supports for the crossbar being interconnected to internal threads of the integrated fasteners.
Figure 11:
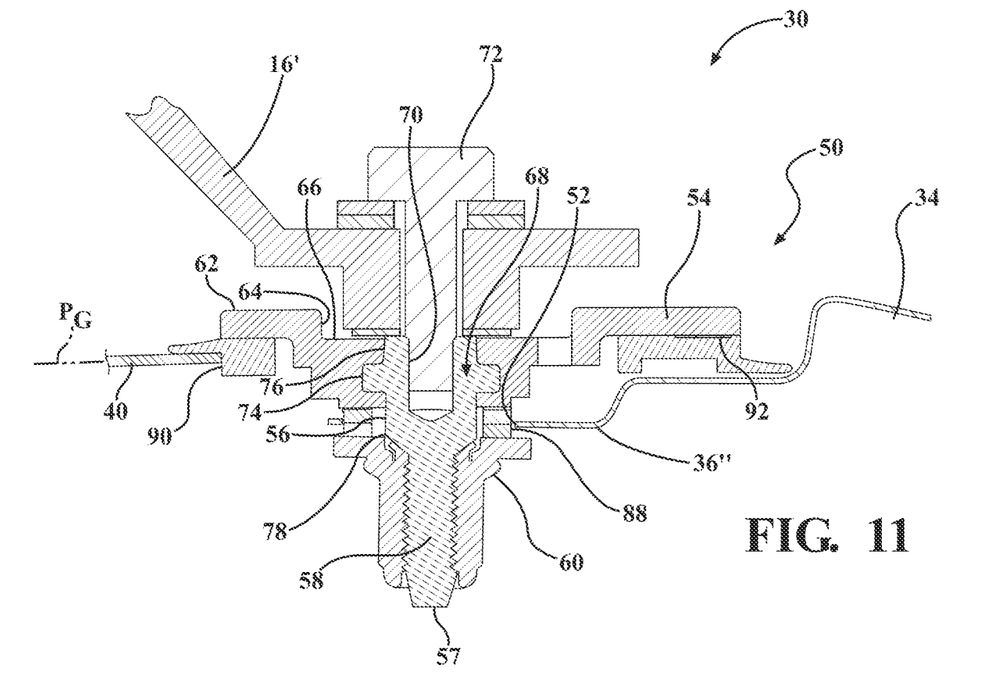
FIG. 11 is a cross-sectional view of the LPCMP assembly secured to the header of the vehicle body.
Figure 12:
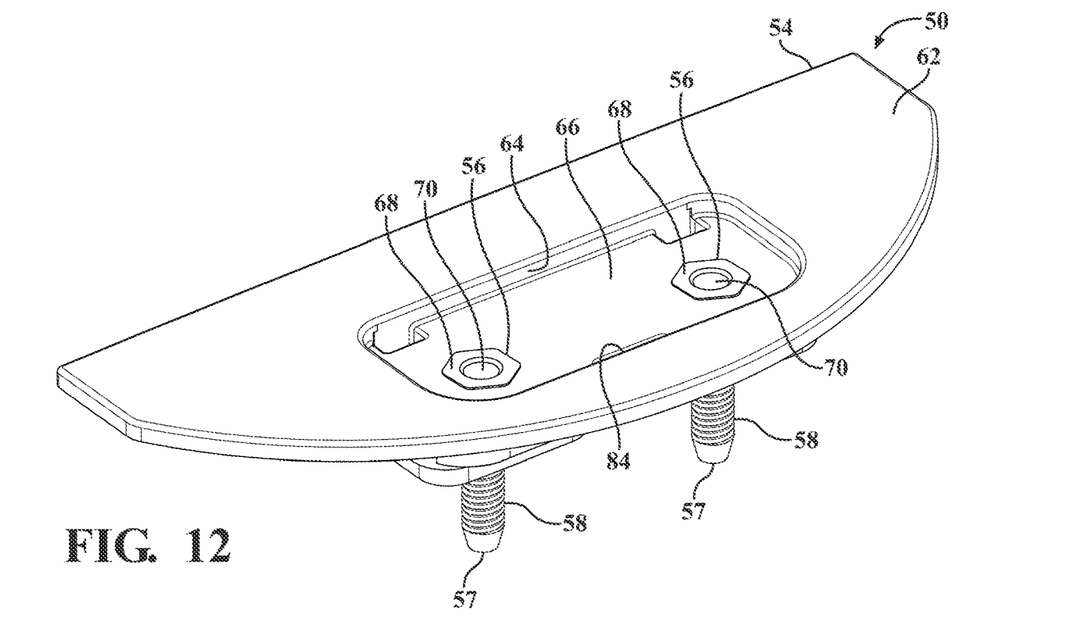
FIG. 12 is a perspective view of the mounting plate of the LPCMP assembly to more clearly illustrate the over molded, integrated fasteners.

As best illustrated in FIGS. 4-5, 9 and 11-12, a top surface 62 of the mounting plate 54 is exposed to an environment of the vehicle body 30 and defines a recessed cavity 64 extending downwardly from the top surface 62 to a bottom cavity surface 66. Each of the integrated fasteners 36 extend downwardly from a top end 68 disposed flush with the bottom cavity surface 66 of the recessed cavity 64, through the respective aperture 52 and to the bottom end 57 which is disposed below the roof flange 36. The top end 68 of each integrated fastener 36 defines an internal thread 70 that is exposed to the cavity 64 and thus an environment of the vehicle body 30 when the mounting plate 54 is secured to the roof flange 36. Accordingly, as best illustrated in FIG. 9-11, supports 16' for the crossbar 18' can be secured to the mounting plate 54 by threading support fasteners 72 with the internal threads 70 of the integrated fasteners 56 of the LPCMP assembly 50. The integrated fasteners 56 of the LPCMP assembly 50 integrates both the body mounting screw as well as the crossbar mounting internal threads from the prior art designs into a single, integrated fastener 56, leading to a reduction of the overall z-depth requirements for the integrated fastener 56. Accordingly, the LPCMP assembly 50 reduces the roof ditch depth requirements, such as by approximately 50% (e.g., from approximately 22 mm for the prior art roof ditch depth $D_{PA}$ to approximately 11 mm for the subject roof ditch depth Di as comparatively shown in FIGS. 3-4, respectively), relative to the prior art designs. It is also contemplated that the reduced overall z-depth requirements could allow the LPCMP assembly 50 to be utilized with a vehicle body design that completely eliminates the roof ditch, and thus provides improved flexibility for the current design. The LPCMP assembly 50 with the mounting plate 50 having integrated fasteners 56 eliminates the need for the roof rail from the prior art designs. Relatedly, attachment of the mounting plate 54 directly to the roof flange 36 of the vehicle body 30 advantageously will direct stress from the attached crossbars 18' away from the glass roof 40 and onto the sheet metal of the vehicle body 30.

Figure 13:
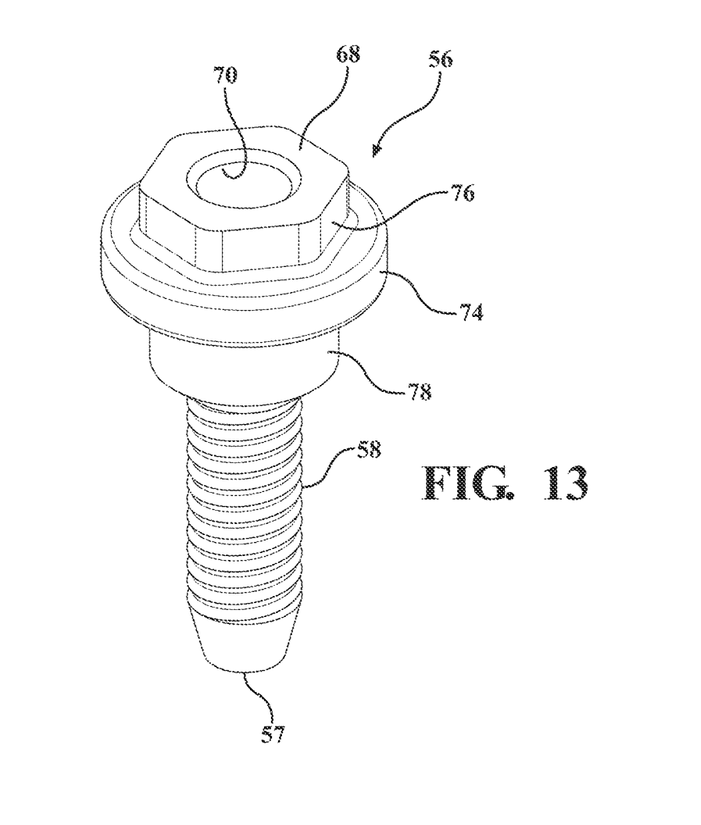
FIG. 13 is a perspective view of an integrated fastener of the LPCMP assembly.

As best illustrated in FIGS. 4-5, 11 and 13, each integrated fastener 56 includes a flange 74 extending radially outwardly from adjacent the top end 68 such that when the mounting plate 54 is over molded with the integrated fasteners 56 (See FIGS. 4 and 11), the flange 74 provides an anti-pullout feature which prevents the integrated fastener 56 from backing out into the recessed cavity 64 and being removed from the LPCMP assembly 50. As further illustrated in FIGS. 4, 11 and 13, the integrated fastener 56 can also include an anti-rotation feature 76, such as a hexagon profile shown in FIG. 13, disposed adjacent the top end 68 in mating relationship with the mounting flange 54 for preventing the integrated fastener 56 from rotating within the apertures 52 and relative to the mounting plate 54 when the support fasteners 72 are threaded with the internal threads 70 to secure the supports 16' and the crossbar 18' to the LPCMP assembly 50. Although shown as having a hexagon profile, the anti-rotation feature 76 can have other alternative shapes, such as square, D-shaped, or knurl cross-sectional shapes, without departing from the scope of the subject disclosure. As best illustrated in FIGS. 11 and 13, the integrated fastener 56 can also include a body locator feature 78 to assist in the over molding/insert molding manufacturing process with the mounting plate 54.

Figure 6:
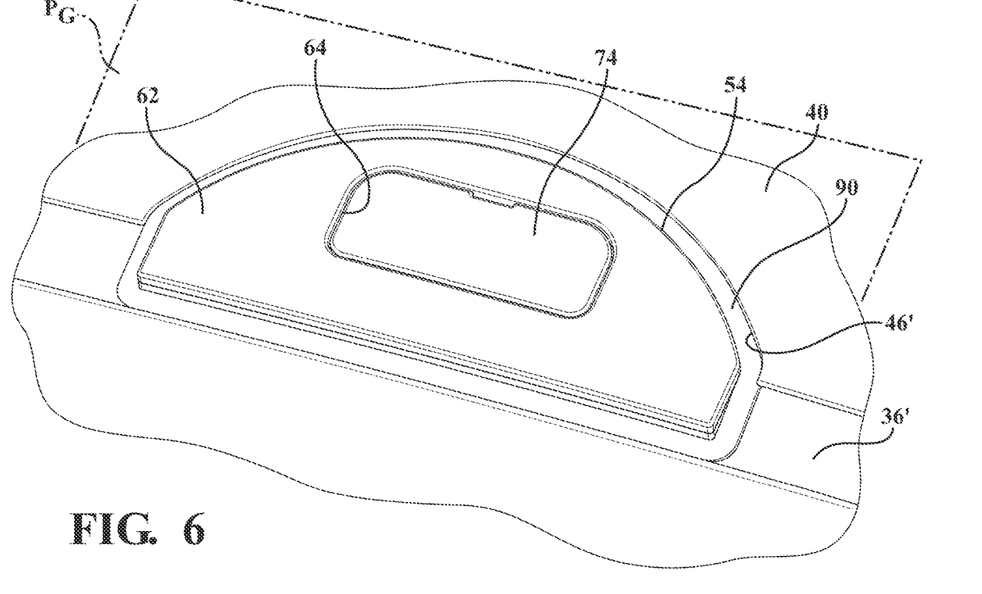
FIG. 6 is a top perspective view of the LPCMP assembly illustrating a lid disposed within a recessed cavity of a mounting plate to cover and protect integrated fasteners over molded into the mounting plate.
Figure 7:
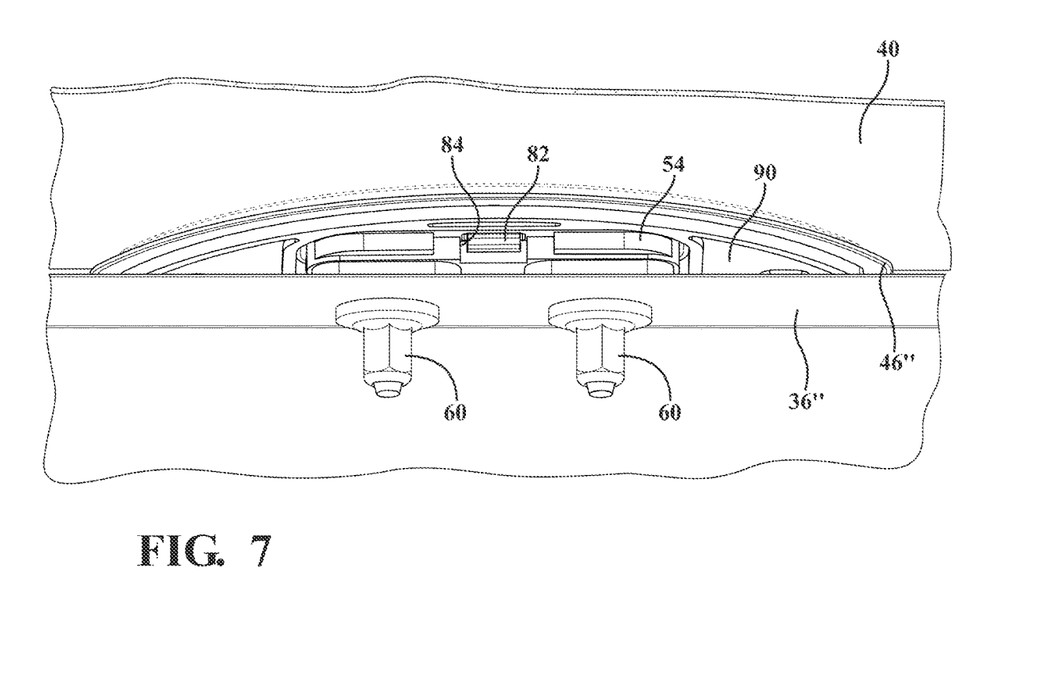
FIG. 7 is a bottom perspective view of the LPCMP assembly illustrating the integrated fasteners passing through apertures defined by the roof flange of the header and a pair nuts threaded onto a threaded portion of the integrated fasteners to secure the mounting plate to the roof flange and thus the header of the vehicle body.
Figure 8:
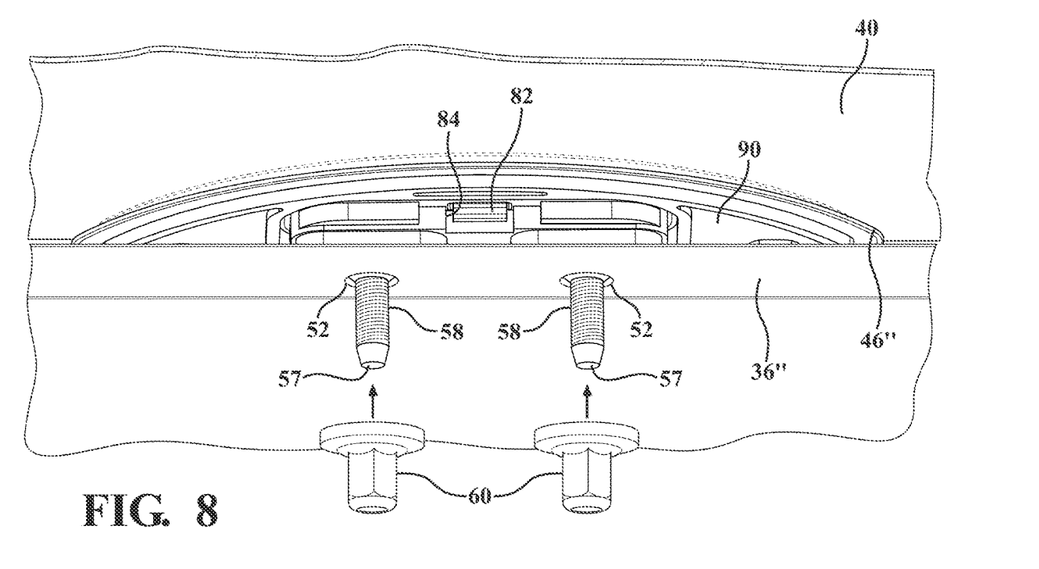
FIG. 8 is a bottom perspective view of the LPCMP assembly illustrating the integrated fasteners passing through the apertures defined by the roof flange and the pair of nuts disposed in spaced relationship and prior to being threaded onto the threaded portion of the integrated fasteners.

As best illustrated in FIGS. 4-6, the LPCMP assembly 50 includes a lid 74 which is disposed within and releasably secured to the recessed cavity 64 for covering the integrated fasteners 56 and keeping debris and water out of the recessed cavity 64 and the internal threads 70 when the crossbar 18' is not mounted or secured to the LPCMP assembly 50. As best illustrated in FIGS. 5 and 7-8, the lid 74 can include a plurality of locking tabs 82 that removably mate with corresponding locking slots 84 defined by the mounting plate 54 to keep the lid 74 secured and in place. As illustrated in FIGS. 4-5, pad 86 comprised of closed cell foam can also be placed within the recessed cavity 64 in sandwiched relationship between the lid 80 and the bottom cavity surface 66 to cover the integrated fasteners 56 and prevent water ingress into the internal threads 70. At least one gasket 88 comprised of closed cell foam can also be placed around each of the integrated fasteners 36 and in surrounding relationship with the apertures 52 to prevent water ingress from the LPCMP assembly 50 to the roof flange 36 of the vehicle body 10. While the pad 86 and gasket 88 are described as being comprised of a closed cell foam material, other materials suitable for sealing these locations could also be utilized without departing from the scope of the subject disclosure.

As best illustrated in FIGS. 4-6 and 11, the LPCMP assembly 30 includes a gap hiding plate 90 disposed in sandwiched relationship between the mounting plate 54 and the roof flange 36. The gap hiding plate 90 also extends around a perimeter of the mounting plate 54 and thus is disposed between the mounting plate 54 and the glass cut-out 46 of the glass roof 40 to seal a visual gap between these components, and absorb variation and vibration between the mounting plate 54 and the glass roof 40 during use of the vehicle body 30 to avoid glass cracking. Use of the gap hiding plate 90 also advantageously allows the plastic trim component to be eliminated, as required by the prior art designs. As illustrated in FIG. 5, an adhesive 92, such as double sided tape, can be disposed in sandwiched relationship between the mounting plate 54 and the gap hiding plate 90 for holding these components in place relative to one another. However, other means of a mechanical fastener could be used to hold the gap hiding plate 90 to the mounting plate 54 without departing from the scope of the subject disclosure.

Obviously, many modifications and variations of the present disclosure are possible in light of the above teachings and may be practiced otherwise than as specifically described.

What is claimed is:

1. A vehicle body comprising:
   a first and second header extending in spaced and generally parallel relationship with one another;
   a glass roof extending between a first glass side disposed adjacent said first header and a second glass side disposed adjacent said second header;
   said glass roof defining at least one first glass cut-out extending inwardly from said first glass side and at least one second glass cut-out extending inwardly from said second glass side and disposed in aligned relationship with said at least one first glass cut-out; and a plurality of low profile crossbar mounting plate (LPCMP) assemblies each secured to a respective one of said first or second headers and extending into a respective one of said first or second glass cut-outs for use in releasably securing a crossbar to the vehicle body.

2. The vehicle body as set forth in claim 1, further comprising:

said at least one first glass cut-out including a first pair of glass cut-outs disposed in spaced relationship with one another along said first glass side and said at least one second glass cut-out including a second pair of glass cut-outs disposed in spaced relationship with one another along said second glass side and aligned with said first pair of glass cut-outs on said opposing first glass side, and said plurality of LPCMP assemblies including a first pair of LPCMP assemblies secured to said first header and each extending into a respective one of said first pair of glass cut-outs and a second pair of LPCMP assemblies secured to said second header and each extending into a respective one of said second pair of glass cut-outs for use in releasably securing a pair of crossbars to the vehicle body.

3. The vehicle body as set forth in claim 1, further comprising:

said first header including a first roof flange extending inwardly towards said second header;

said second header including a second roof flange extending inwardly towards said first header; and said plurality of LPCMP assemblies each secured to a respective first or second roof flange of said first or second header.

4. The vehicle body as set forth in claim 3, wherein said first and second roof flanges each define at least one aperture disposed adjacent a respective one of said first or second glass cut-outs, and said plurality of LPCMP assemblies each are secured to a respective aperture of said first or second header.

5. The vehicle body as set forth in claim 4, wherein said at least one aperture includes a pair of apertures defined by said first and second roof flanges adjacent each of said respective ones of said first or second glass cut-outs.

6. The vehicle body as set forth in claim 5, wherein said plurality of LPCMP assemblies each include a mounting plate which extends from adjacent said first or second header and into said respective one of said first or second glass cut-outs.

7. The vehicle body as set forth in claim 6, wherein each of said at least one first and second glass cut-outs and said mounting plate are semi-circular shaped.

8. The vehicle body as set forth in claim 6, wherein said mounting plate includes a pair of integrated fasteners mated with said pair of apertures to secure each of said LPCMP assemblies to said respective first or second roof flange.

9. The vehicle body as set forth in claim 7, wherein said pair of integrated fasteners are overmolded into said mounting plate.

10. The vehicle body as set forth in claim 7, wherein each of said pair of integrated fasteners extend downwardly from a top end to a bottom end which defines an external thread, and said LPCMP assembly includes a nut threaded onto each external thread and tightened against a lower surface of said respective first or second roof flange to secure each LPCMP assembly to said respective first or second header.

11. The vehicle body as set forth in claim 10, wherein said mounting plate of each LPCMP assembly includes a top surface exposed to an environment of the vehicle body and which defines a recessed cavity extending downwardly from said top surface to a bottom cavity surface, and said top end of said pair of integrated fasteners is disposed flush with said bottom cavity surface.

12. The vehicle body as set forth in claim 11, wherein said top end of said pair of integrated fasteners defines an internal thread being exposed to said recessed cavity for receiving support fasteners from supports of the crossbar.

13. The vehicle body as set forth in claim 12, wherein each LPCMP assembly includes a lid disposed within and releasably secured to said recessed cavity for covering said pair of integrated fasteners and keeping debris and water out of said internal threads when the crossbar is not mounted to said LPCMP assembly.

14. The vehicle body as set forth in claim 13, wherein said lid includes a plurality of locking tabs disposed in removably mated relationship with locking slots defined by said mounting plate.

15. The vehicle body as set forth in claim 14, wherein each LPCMP assembly includes a pad disposed within said recessed cavity in sandwiched relationship between said lid and said bottom cavity surface to cover said integrated fasteners.

16. The vehicle body as set forth in claim 15, wherein each LPCMP assembly includes at least one gasket placed around each of said integrated fasteners and disposed in surrounding relationship with respective ones of said apertures to prevent water ingress from said LPCMP assembly to said first or second roof flange.

17. The vehicle body as set forth in claim 8, wherein each LPCMP assembly includes a gap hiding plate disposed in sandwiched relationship between said mounting plate and said respective first or second roof flange, and wherein said gap hiding plate is disposed between said mounting plate and said respective first or second glass cut-out to seal a visual gap and absorb vibrations therebetween.

18. The vehicle body as set forth in claim 17, wherein each LPCMP assembly includes an adhesive disposed in sandwiched relationship between said mounting plate and said gap hiding plate.

19. The vehicle body as set forth in claim 10, wherein each integrated fastener includes a flange extending radially outwardly from adjacent said top end for providing an anti-pullout feature which prevents said integrated fastener from backing out into said recessed cavity.

20. The vehicle body as set forth in claim 12, wherein each integrated fastener includes an anti-rotation feature disposed adjacent said top end and in mating relationship with said mounting plate for preventing said integrated fastener from rotating within said respective aperture and relative to said mounting plate when the support fasteners are threaded with said internal threads to secure the supports and the crossbar to said LPCMP assembly.

* * * * *